United States Patent
Gregory

[11] 3,727,457
[45] Apr. 17, 1973

[54] APPARENT WIND INDICATOR

[76] Inventor: Nicholas Gregory, 40 Haggetts Pond Road, Andover, Mass.

[22] Filed: Jan. 21, 1969

[21] Appl. No.: 792,246

[52] U.S. Cl. ....................................73/188, 308/36.1
[51] Int. Cl. ...............................................G01w 1/00
[58] Field of Search......................73/188, 189, 186, 73/181; 116/117, 114, 124; 252/49.6; 308/36.1; 324/115

[56] References Cited

UNITED STATES PATENTS

| | | | |
|---|---|---|---|
| 3,641,815 | 2/1972 | Fassett | 73/188 |
| 2,363,087 | 11/1944 | Salisbury | 73/188 |
| 2,836,064 | 5/1958 | York | 73/188 |
| 2,400,190 | 5/1946 | Clark | 324/115 |

*Primary Examiner*—James J. Gill
*Assistant Examiner*—Arthur E. Korkosz
*Attorney*—Robert Shaw

[57] ABSTRACT

An apparent wind indicator for indicating the wind direction relative to a moving sailboat. The indicator shows relative wind direction for both downwind and tacking maneuvers of the boat. The readout unit of the indicator provides one-for-one correspondence between incremental changes of direction for downwind travel and a much greater incremental change in readout for a given change in wind direction during tacking. The indicator employs a circular-track potentiometer disposed at the top of the mast of the boat and the readout unit is at deck level. In one embodiment the change in incremental readout as a function of wind direction changes for tacking is effected by shorting out a major portion of the track leaving two minor portions which are tied together to allow both starboard and port tacks to be read over a large part of the readout scale (i.e., the order of 330°). In another embodiment a plurality of differential amplifiers is used to effect the same result. The apparatus is adapted to be combined with other boat devices such as, for example, velocity recording apparatus, to give combined indications.

11 Claims, 6 Drawing Figures

PATENTED APR 17 1973　　　3,727,457

INVENTOR.
NICHOLAS GREGORY
By Robert Shaw
Attorney

APPARENT WIND INDICATOR

The present invention relates to wind indicators for sailboats and the like.

The invention herein described provides an indication to the operator of a sailboat of the wind relative to the boat, that is, the apparent wind. This relative or apparent wind is, of course, a vector sum that includes an ambient wind vector plus a vector representing boat movement with relation to the ambient wind. Any wind vane used to orient to the wind direction must be placed at the top of the mast of a sailing vessel to avoid local wind conditions that exist below the mast top due to turbulence caused by the sails and other structures on the boat. In order to furnish readings on an instrument at deck level, it is necessary to transmit some signal from the vane to a meter at deck level. In prior art devices, selsyn units have been used at the top of the mast to provide signals to represent vane direction and such units furnish a one-to-one correspondence between vane direction changes and meter reading changes at deck level. Such units require considerable electric power to operate, which is a handicap in small boats where any load upon the electric system is viewed quite critically and in which failures and voltage variations in the electric system are common, and, also, the one-to-one corresponding between meter angular changes and vane angular changes does not allow an operator to discern small angular variations in the apparent wind. Such small angle changes are particularly important during tacking.

Accordingly, an object of the present invention is to provide an apparent wind indicator for sailboats and the like, wherein, within a range (as the typical angular range for tacking maneuvers) changes in the angular orientation of a wind vane on the mast of the boat are multiplied in order to furnish incremental angular changes on a meter greater than incremental angular changes in the vane orientation that the meter readings represent, but which can provide, as well, one-to-one correspondence between angular changes in vane orientation and changes in the meter reading.

A further object is to provide in practical apparatus meter changes of, for example, eight or more degrees for each degree change in the vane orientation.

Another object is to provide an electrically powered wind indicator instrument, which power requirements are small so that a battery to serve as a source of power can be contained within the instrument.

Still another object is to provide an apparent wind indicator having an electrical output which can be combined with an electrical output from, for example, a velocity meter to furnish a combined output on one instrument.

These and other objects will be evident in the discussion to follow and will be particularly pointed out in the appended claims.

By way of summary, the objects are attained in apparatus for indicating wind direction relative to a sailing vessel, that comprises, a wind vane rotatably mounted to orient parallel to the wind, a circular potentiometer secured to the vane and adapted to rotate in response to rotation of the vane, a voltage source connected to the potentiometer, and a voltage readout means connected to receive an output voltage from the potentiometer indicative of the directional orientation of the wind vane. The potentiometer is adapted to provide a relationship between incremental changes in the orientation of the wind vane and changes in the output voltage. Means is provided for altering the relationship between changes in the orientation of the wind vane and changes thereby effected in the output voltage presented to the readout means to provide a larger shift in the voltage presented to the readout means effected by incremental changes in the orientation of the wind vane.

The invention will now be described with reference to the accompanying drawing in which.

Figure 1:
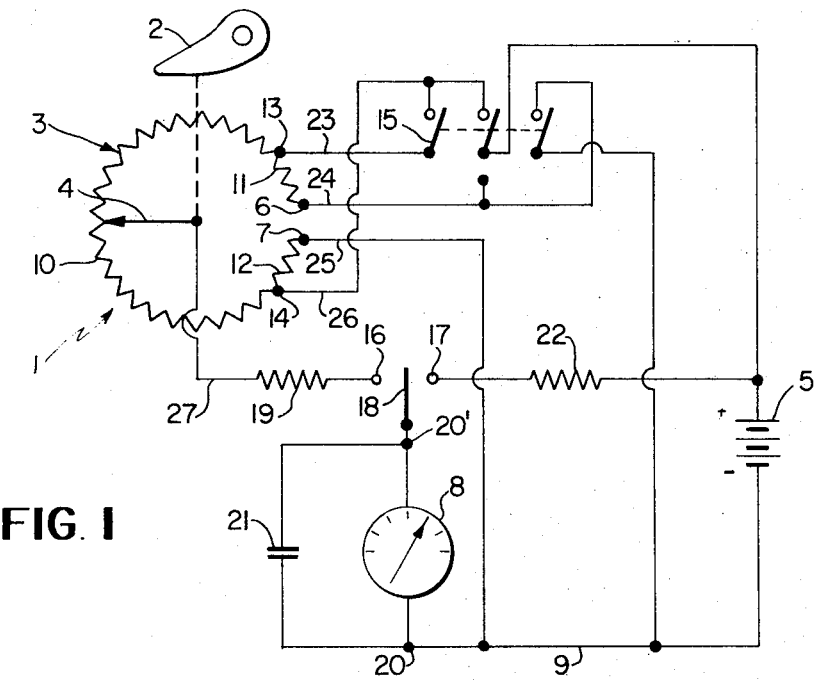
FIG. 1 is a schematic circuit diagram of a preferred form of the apparent wind indicator apparatus of the invention.

Turning now to the drawing, apparatus is shown schematically at 1 for indicating apparent wind direction relative to a sailing vessel. The apparatus comprises a wind vane 2 rotatably mounted at the top of the mast (not shown) of such a vessel to orient parallel to the wind. A circular potentiometer 3, also located at the top of the mast, is secured to the vane 2 to rotate in response to rotation of the vane; in practice a shaft is attached to the wiper (shown at 4) of the potentiometer, and the shaft is extended upward to receive the vane which is secured thereto by a set screw. Electrical connection between the potentiometer and associated circuitry is made through five wires numbered 23, 24, 25, 26 and 27, which extend the length of the mast. A preferably d-c voltage source 5 is connected across the potentiometer between the ends 6 and 7 thereof.

The angular position of the potentiometer 3 (and, thus, the vane 2) at any particular instant of time is shown upon a voltage readout device 8 connected to receive an output voltage from the potentiometer between the wiper arm 4 and a common lead 9 of the voltage source connected to the end 6. The readout device can be a voltmeter, an ammeter, a sound device, a set of lights, a digital readout, or some other device calibrated to furnish an indication at deck level of the pointing direction of the vane 2. The potentiometer 3 is adapted to provide a linear relationship between incremental angular changes in the position of the wind vane 2 and the output voltage of the potentiometer, and the circuit elements are chosen to furnish a one-to-one relationship between incremental angular changes of the vane and corresponding changes in the meter reading. However, for critical sailboat maneuvers as, for example, tacking, a major portion 10 of the potentiometer track (the portion between 13 and 14 in FIG. 1) is shorted or by-passed thereby to change the relationship between incremental changes in the orientation of the wind vane and changes thereby effected in the output voltage appearing across the readout device 8 to provide a larger shift in voltage (and, thus, a corresponding larger shift in the readout device) with incremental changes in the direction of the apparent wind and corresponding changes in the orientation of the wind vane.

The shorting function in FIG. 1 is accomplished by a switch 15, but other shorting means can be used, as discussed hereinafter. The switch 15 is a three-pole, double-throw switch in which all three poles are used in the upper position, as shown, but in which one pole only is used in the lower position. When the switch is closed in the upper position, the ends 6 and 7 are connected together and the output voltage of the d-c source, which previously appeared across the whole potentiometer winding comprising the major portion 10 and minor portions 11 and 12, appear across the minor portions 11 and 12. The portions 11 and 12 may each span 40 degrees of the potentiometer winding (and they are connected in parallel), and the portion 10 correspondingly spans 250° in this circumstance; so about eight (plus) times greater voltage appears across the portions 11 and 12 when the switch 15 is in the upper position than when the full winding is across the d-c source 5. (The full winding is 330° since the gap between points 6 and 7 is 30° in the illustrative example; although the minor portions can be less or greater than 40° with corresponding changes in the other portions.) Thus, any change in wiper position along the portions 11 and 12 will result in a corresponding voltage change across the readout device 8 that is eight times what it is when the whole potentiometer (330°) is across the d-c source 5. In actual apparatus the position of the wiper 4 shown in FIG. 1 represents a downwind condition; i.e., the apparent wind is directly astern and moving in the same direction as the sailboat. The gap between the ends 6 and 7, diametrically disposed from the 180° position, represents the zero position; i.e., the apparent wind has a direction parallel to the direction in which the sailboat is moving but is moving in a direction exactly opposite to the direction of movement of the boat. Tacking for most sailboats is done between about 20° and 40° either side of the zero position. Since the boat is never sailed, except transitorily, between plus and minus 20°, the 30° gap offers no problem. Form the previous explanation it can be seen that one readout meter at 8 serves to indicate both starboard and port tacks and, also, by changing the position of the switch 15 to the down position, the same meter serves to indicate apparent wind directions not within the narrow tacking range. When the switch is in the down position, the voltage of the d-c source 5 appears across the full 330° track of the potentiometer, as mentioned.

In FIG. 1 the meter 8 is shown connected to a switch 18 which, when closed upon the contact point designated 16, connects the meter to the potentiometer 3. The switch 18 may be connected, also, to the contact point shown at 17 to connect the meter 8 across the battery through a resistance 22 to furnish a battery test indication for the apparatus. Balancing circuitry is provided by a resistance 19, and a capacitance 21 serves to damp meter fluctuations.

Figure 2:
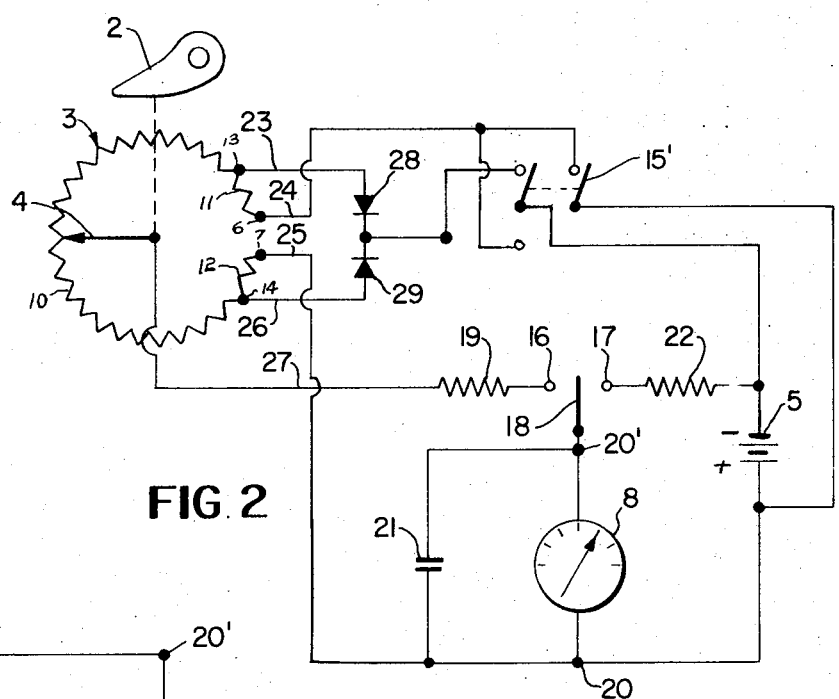
FIG. 2 shows, schematically, a modification of the embodiment of FIG. 1.

The shorting function of the switch 15 can be afforded by a pair of diodes connected back-to-back. Diodes connected to serve this purpose are shown schematically at 28 and 29 in FIG. 2.

Figure 3:
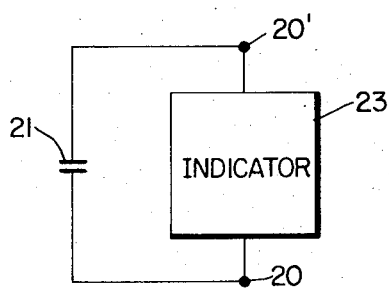
FIG. 3 is a schematic representation of circuitry adapted to replace the circuitry between points 20 and 20' in FIG. 1.

The readout device 8 connected between points 20 and 20' in FIG. 1 is preferably a voltmeter, but, as mentioned, other indicating means can be used. For example, it may be desirable to have an indication of travel within a very narrow portion of the minor portions 11 and 12 to optimize tacking of a particular boat, and multi-colored lights, as represented by the block shown at 23 in FIG. 3, to indicate maximum and minimum voltage levels can be used; other means may be used, as well. For example, a multi-pitch sonic device can be used at 23, and the device 23 can be paralleled with the meter 8 between points 20 and 20'.

Figure 4:
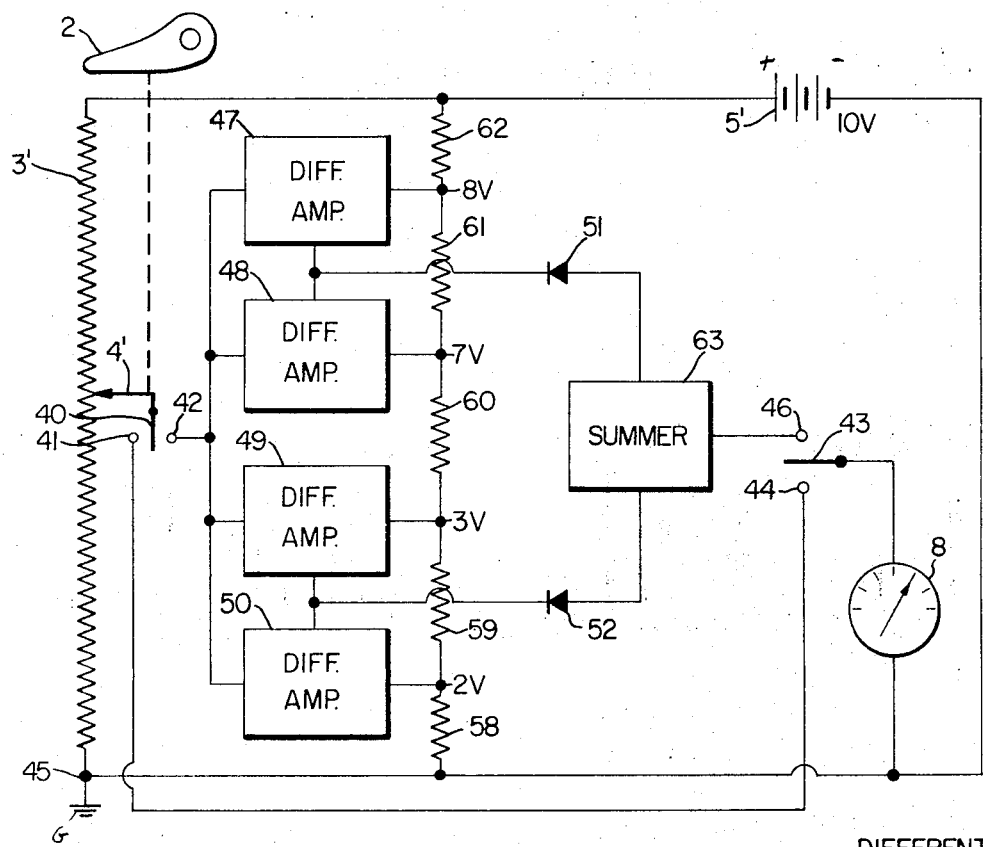
FIG. 4 is a schematic showing, partially in block diagram form, of a further modification.

In FIG. 4 a voltage divider network and a plurality of differential amplifiers are shown as the means for altering the relationship between changes in the orientation of the vane 2 and the changes thereby effected in the voltage signal presented to the readout means 8. When a switch 40 is closed upon its terminal 41 and a switch 43 is closed upon its terminal 44, the voltage between the wiper arm 4' of a circular potentiometer 3' and one end 45 thereof appears across the readout means 8 to provide an indication on the readout means for run maneuvers, as previously discussed. For tacking maneuvers the switch 40 is closed upon its terminal 42 and the switch 43 upon its terminal 46, and signals to the voltmeter 8 are provided in a manner now to be explained.

Figure 5:
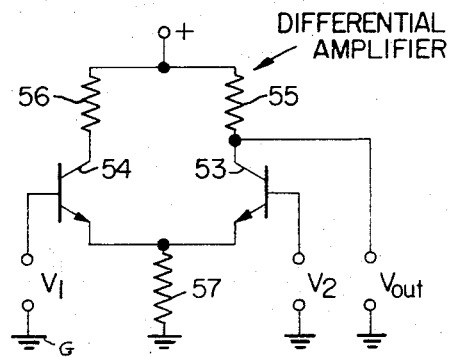
FIG. 5 shows schematically a differential amplifier typical of the amplifiers shown in block form in FIG. 4.

The differential amplifiers are shown at 47, 48, 49 and 50 in FIG. 4 connected between the wiper arm 4' and the network; the amplifiers 48 and 50 perform an amplifier function and the amplifiers 47 and 49, as later explained, perform a control function, acting in combination with diodes 51 and 52, respectively, to provide voltage level sensing means selectively to connect the amplifiers 48 and 50 to the voltmeter 8 in a manner determined by the relative voltage levels at the wiper arm and at the network connection of each of the control amplifiers 47 and 49. The manner in which the amplifiers functions can best be explained with reference to FIG. 5 where a typical amplifier of the type herein required is shown schematically. Differential amplifiers furnish an output voltage, as $V_{out}$, proportional to the difference between two input voltages, as $V_1$ and $V_2$, and zero output when the inputs are equal. The amplifier in FIG. 5 is single ended and the elements thereof are symmetrical to provide an output at $V_{out}$ only when $V_1 > V_2$. The amplifier shown comprises transistors 53 and 54 the collectors of which are connected to a source of + potential through series resistances 55 and 56, respectively, and the emitters of which are connected to ground G through a common resistance 57. (Ground here denotes chassis or common connection; neither the ground connection nor the +, 10 volt d-c, connection is shown with relation to the amplifiers 47–50 in FIG. 4 for simplicity of drawing.)

In FIG. 4 a power source 5' is shown having an output voltage of 10 volts to simplify the explanation to follow. The voltage divider network comprises resistances 58, 59, 60, 61 and 62 chosen to provide intermediate voltages along the network of 2, 3, 7 and 8 volts in the illustrative embodiment. A reference voltage signal $V_2$ to the amplifiers is derived from the network and a further voltage signal input $V_1$ is derived from the wiper arm 4'. When the reference voltage $V_2$ to the amplifier 50 is 2.0 volts, in the illustrative example, and the voltage $V_1$ is between zero (ground) and 2.0 volts, there is no output voltage $V_{out}$ from the amplifier 50. However, when the wiper voltage exceeds 2.0 volts there is a $V_{out}$ which is fed through the diode 52 (which is biased on) to a summer 63 and thence to the voltmeter 8. The differential amplifier 49 is adapted to back bias the diode 52 to off when the wiper voltage exceeds 3 volts. Similarly, the differential amplifier 48 provides an output voltage when the wiper arm input thereto exceeds 7.0 volts and the amplifier 47 serves to bias the diode 51 off when the wiper arm voltage exceeds 8.0 volts.

Figure 6:
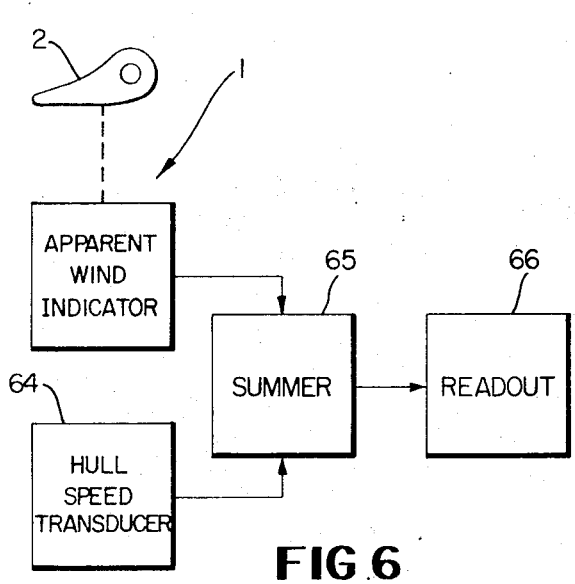
FIG. 6 is a block diagram showing the output of the apparatus of FIG. 1 combined with the output of a velocity device to give a combined output reading.

In FIG. 6 the output of the apparent wind indicator 1, taken between the points 20 and 20' in FIG. 1, is introduced to a summer 65 where it is combined with the output of a hull speed transducer 64. The hull speed transducer typically is a speedometer having an output voltage proportional to the velocity of the boat. Such speedometers generally include a propeller which, upon turning, generates an a-c voltage which can be rectified to provide a d-c voltage proportional to the velocity of the boat through the water; also, drag speedometer devices wherein a bridge or strain gage network provides a d-c voltage output proportional to the velocity of the boat, can be used. The speedometer voltage output and the potentiometer voltage output are connected to the summer network 65 which is adapted to maximize the sum of the two voltages thereby to provide means for minimizing time of travel between two points through the water, usually in a tacking maneuver of the boat. The summer network 65 output is fed to a readout device 66.

In operable apparatus there is included appropriate on-off switching, lighting, etc. The winding indicator described herein in connection with FIGS. 1 and 2 typically requires 1.5 volts and uses very little power; for that reason, the power supply 5 can be a flash-light battery housed within the same case at the voltmeter 8 and the other circuit elements shown in FIG. 1, with the exception of the potentiometer. The indicator described in connection with FIG. 4, requires at least 10 volts d-c, but again the power requirements are small and the power source 5' can be a battery.

Modifications of the invention herein described will occur to those skilled in the art, and all such modifications are considered to be within the spirit and scope of the invention.

What is claimed is:

1. Apparatus for indicating wind direction relative to a sailing vessel, that comprises, a wind vane rotatably mounted to orient parallel to the wind, circular-track potentiometer means having a wiper secured to a rotatable shaft which upon rotation effects movement of the wiper along the track and in contact therewith, the potentiometer track having a gap and having a major portion separating two minor portions between the ends of the track, the shaft being secured to the vane and adapted to rotate in response to rotation of the vane, a voltage source connected to the ends of the potentiometer track, voltage readout means connected to receive a potentiometer output voltage between the wiper and one of said ends indicative of the directional orientation of the wind vane, the potentiometer being adapted to provide a first relationship between incremental changes in the orientation of the wind vane and incremental changes in the output voltage, means for altering the relationship between incremental changes in the orientation of the wind vane and incremental changes thereby effected in the voltage presented to the readout means to provide a larger shift in the voltage presented to the readout means with incremental changes in the orientation of the wind vane, and in which said means for altering comprises switch means adapted to by-pass the major portion of the potentiometer track and simultaneously connect said ends together thereby to connect the voltage source across said minor portions and provide an output to the voltage readout means taken between the wiper and the connected ends of the track.

2. Apparatus as claimed in claim 1 in which the switching means includes a pair of diodes connected back-to-back across said major portion.

3. Apparatus as claimed in claim 1 in which the switch means comprises a switch connected to by-pass said major portion.

4. Apparatus as claimed in claim 1 including a speedometer having a voltage output proportional to velocity of the vessel, the speedometer voltage output and the potentiometer voltage output being connected to a summing network adapted to maximize the sum of the two voltages thereby to provide means for minimizing time of travel between two points in a tacking maneuver.

5. Apparatus as claimed in claim 1 in which the voltage source is a battery.

6. Apparatus as claimed in claim 5 in which means is provided to connect the readout means across the battery to furnish a battery test indication.

7. Apparatus for indicating wind direction relative to a sailing vessel, that comprises, a wind vane rotatably mounted to orient parallel to the wind, circular-track potentiometer means having a wiper secured to a rotatable shaft which upon rotation effects movement of the wiper along the track and in contact therewith, the shaft being secured to the vane and adapted to rotate in response to rotation of the vane, the track having a gap, a voltage source connected to the ends of the potentiometer track, voltage readout means connected to receive a potentiometer output voltage indicative of the directional orientation of the wind vane, the potentiometer being adapted to provide a relationship between incremental changes in the orientation of the wind vane and incremental changes in the output voltage, and means for altering the relationship between incremental changes in the orientation of the wind vane and incremental changes thereby effected in the voltage presented to the readout means with incremental changes in the orientation of the wind vane, the means for changing the relationship including a reference voltage divider network connected to receive a voltage output from the potentiometer, and a plurality of differential amplifiers each connected to derive a reference voltage signal from the network and a further voltage signal from the wiper of the potentiometer and to amplify any difference voltage between the two signals, the amplified difference voltage being fed to the voltage readout means, voltage level sensing means being provided selectively to connect the amplifiers to the readout means thereby to determine which of said amplifiers shall be fed thereto.

8. Apparatus as claimed in claim 7 in which the amplifiers are single ended and adapted to provide an output voltage only when the further voltage is greater than the reference voltage.

9. Apparatus as claimed in claim 8 in which said output voltage is fed to a summer and the summer output is fed to readout means.

10. Apparatus as claimed in claim 9 in which the voltage level sensing means comprises control differential amplifiers and diodes, the control differential amplifiers being connected between the wiper arm and the network and the diodes being connected selectively to connect said output voltage to the summer, the diodes being biased on and off by the control amplifiers in a manner determined by the relative voltage levels at the wiper arm and at the network connection to each of said control amplifiers.

11. Apparatus as claimed in claim 7 that includes a speedometer having a voltage output proportional to the velocity of the vessel, and in which said amplified difference voltage is fed to a summer to provide a voltage output, the speedometer voltage output and the summer voltage output being connected to a summing network adapted to maximize the sum of the speedometer voltage and the summer voltage thereby to provide means for minimizing time of travel between two points in a tacking maneuver.

* * * * *